United States Patent
Sakae et al.

(10) Patent No.: US 8,801,444 B2
(45) Date of Patent: Aug. 12, 2014

(54) BUSBAR AND BUSBAR MANUFACTURING METHOD

(75) Inventors: Akira Sakae, Kobe (JP); Kotaro Toyotake, Kitakyushu (JP)

(73) Assignee: Kobe Steel, Ltd., Kobe-shi (JP)

( * ) Notice: Subject to any disclaimer, the term of this patent is extended or adjusted under 35 U.S.C. 154(b) by 33 days.

(21) Appl. No.: 13/635,470

(22) PCT Filed: Mar. 24, 2011

(86) PCT No.: PCT/JP2011/057255
§ 371 (c)(1),
(2), (4) Date: Sep. 17, 2012

(87) PCT Pub. No.: WO2011/122453
PCT Pub. Date: Oct. 6, 2011

(65) Prior Publication Data
US 2013/0012079 A1    Jan. 10, 2013

(30) Foreign Application Priority Data

Mar. 29, 2010 (JP) .................................. 2010-075915
Mar. 29, 2010 (JP) .................................. 2010-075917

(51) Int. Cl.
*H01M 4/02* (2006.01)

(52) U.S. Cl.
USPC .......... 439/212; 429/211; 439/887; 72/253.1; 72/343

(58) Field of Classification Search
USPC ........... 429/211; 439/212, 887; 72/253.1, 343
See application file for complete search history.

(56) References Cited

U.S. PATENT DOCUMENTS

| | | | |
|---|---|---|---|
| 2,806,215 A | 9/1957 | Redslob | |
| 6,156,452 A | 12/2000 | Kozuki et al. | |
| 7,714,230 B2 * | 5/2010 | Beulque | 174/117 A |
| 2001/0049054 A1 | 12/2001 | Enomoto et al. | |
| 2010/0248029 A1 * | 9/2010 | Butt et al. | 429/211 |
| 2013/0130572 A1 * | 5/2013 | Sakae | 439/884 |

FOREIGN PATENT DOCUMENTS

| | | |
|---|---|---|
| JP | 57 90224 | 6/1982 |
| JP | 11 195434 | 7/1999 |
| JP | 2002 151045 | 5/2002 |
| JP | 2002 358945 | 12/2002 |
| JP | 2002 373638 | 12/2002 |
| JP | 2002-373638 A | 12/2002 |
| JP | 2003 163039 | 6/2003 |
| JP | 2003-163039 A | 6/2003 |

OTHER PUBLICATIONS

U.S. Appl. No. 13/810,939, filed Jan. 18, 2013, Sakae.
U.S. Appl. No. 13/579,756, filed Aug. 17, 2012, Sakae.
International Search Report Issued Apr. 26, 2011 in PCT/JP11/57255 Filed Mar. 24, 2011.

* cited by examiner

*Primary Examiner* — Gary Paumen
(74) *Attorney, Agent, or Firm* — Oblon, Spivak, McClelland, Maier & Neustadt, L.L.P.

(57) ABSTRACT

A bus bar, which is used with batteries wherein the positive terminal and the negative terminal are each formed from a different metal, and which has excellent mechanical strength and can suppress electrical resistance while preventing galvanic corrosion. The bus bar is bonded in one piece by metallically bonding: a cathode connector that is formed from the same metal as the positive terminal of a battery cell, and that can connect to the positive terminal; and an anode connector that is formed from the same metal as the negative terminal of the battery cell, and that can connect to the negative terminal.

10 Claims, 7 Drawing Sheets

(A)

(B)

BUSBAR AND BUSBAR MANUFACTURING METHOD

TECHNICAL FIELD

The present invention relates to a busbar suitable for use with a battery including a positive terminal and a negative terminal formed of different metals and a method for manufacturing the busbar.

BACKGROUND ART

Assembled batteries in which a plurality of battery cells are connected to each other with busbars so that cathodes and anodes thereof are connected in series are known as batteries for electric vehicles, hybrid vehicles, etc. (see, for example, PTL 1). Such an assembled battery is characterized by having high power and high energy density, and in most cases includes lithium-ion batteries as the battery cells. Lithium-ion batteries include positive terminals formed of aluminum (Al) and negative terminals formed of copper (Cu).

Busbars (or bus bars, which are components used to distribute electric energy) are used to connect the terminals of the battery cells to each other. As disclosed in the Problems to be Solved by the Invention section of PTL 2, a busbar may be manufactured by connecting parts of the busbar together by laser beam welding.

CITATION LIST

Patent Literature

PTL 1: Japanese Unexamined Patent Application Publication No. 2002-373638
PTL 2: Japanese Unexamined Patent Application Publication No. 2003-163039

SUMMARY OF INVENTION

Technical Problem

In the case where the battery cells are connected to each other in series as described above, the positive terminals, which are made of aluminum, are connected to the negative terminals, which are made of copper, with the busbars. Therefore, whether the busbars are formed of aluminum or copper, connection between different metals is required between each busbar and one of the terminals connected thereto.

In general, it is commonly known that when different metals are connected to each other, galvanic corrosion (electrochemical corrosion) occurs due to moisture in the air. As the galvanic corrosion progresses, the busbar and the terminal may become electrically disconnected from each other. Also, the busbar or the terminal may become damaged. Consequently, a serious problem such as not being able to start the electric vehicle may occur.

As a countermeasure against this problem, PTL 2 proposes a method for manufacturing a busbar by bonding an aluminum piece and a copper piece together by laser beam welding. However, when a busbar is manufactured by this method, a eutectic of the two metals is formed at the laser-beam-welded part. This leads to an excessive electrical resistance and significant reduction in mechanical strength (in particular, brittleness and tensile strength). Therefore, the busbar manufactured by this method cannot be put into practical use.

The present invention has been made in view of the above-described circumstances, and an object of the present invention is to provide a high-performance, high-reliability busbar which is suitable for use with a battery including a positive terminal and a negative terminal formed of different metals, in which galvanic corrosion can be suppressed and an electrical resistance can be reduced, and which has high mechanical strength, and a method for manufacturing the busbar.

Solution to Problem

To achieve the above-described object, according to the present invention, a busbar for use with a battery including a positive terminal and a negative terminal formed of different metals, the busbar being used to connect the terminals, includes a cathode connector made of the same metal as the positive terminal of the battery and connectable to the positive terminal and an anode connector made of the same metal as the negative terminal of the battery and connectable to the negative terminal. The cathode connector and the anode connector are integrated together by metallic bonding.

With this busbar, a positive terminal of a battery may be connected to the cathode connector that is made of the same metal as the positive terminal, and a negative terminal of another battery may be connected to the anode connector that is made of the same metal as the negative terminal. Accordingly, galvanic corrosion at the parts connected to the terminals and an increase in electrical resistance due to the galvanic corrosion can be suppressed, and the reliability of the busbar used to connect the batteries can be increased. In addition, the cathode connector and the anode connector of the busbar are integrated together by metallic bonding, and therefore the galvanic corrosion and increase in electrical resistance due to the galvanic corrosion can also be suppressed at the bonding portion.

The term "metallic bonding" means that different metals that are to be bonded together form a bonding interface in which they are tightly bonded at the metal structural level so that conductivity and mechanical bonding strength are increased to "values suitable for a busbar in practical use".

Preferably, the cathode connector is formed of aluminum or an aluminum alloy, and the anode connector is formed of copper or a copper alloy.

It is essential to manufacture the above-described busbar by a manufacturing method including preparing an opposing base material in which a metal base material that forms the cathode connector and a metal base material that forms the anode connector are in surface contact with each other and subjecting the opposing base material to extrusion or drawing using a die under a high hydrostatic pressure.

According to this manufacturing method, a busbar capable of appropriately connecting a positive terminal of a battery to a negative terminal of another battery can be manufactured by integrating the metal material that forms the cathode connector and the metal material that forms the anode connector together by metallic bonding.

To achieve the above-described object, according to the present invention, a busbar for use with a battery including a positive terminal and a negative terminal formed of different metals, the busbar being used to connect the terminals, includes a cathode connector made of the same metal as the positive terminal of the battery and connectable to the positive terminal and an anode connector made of the same metal as the negative terminal of the battery and connectable to the negative terminal. The cathode connector is surrounded by the anode cathode connector or the anode cathode connector is surrounded by the cathode connector in plan view. The cathode connector and the anode connector are integrally bonded together by metallic bonding.

With this busbar, a positive terminal of a battery may be connected to the cathode connector that is made of the same metal as the positive terminal, and a negative terminal of another battery may be connected to the anode connector that is made of the same metal as the negative terminal. Accordingly, galvanic corrosion at the parts connected to the terminals and an increase in electrical resistance due to the galvanic corrosion can be suppressed, and the reliability of the busbar used to connect the batteries can be increased. In addition, the cathode connector and the anode connector of the busbar are integrated together by metallic bonding, and therefore the galvanic corrosion and increase in electrical resistance due to the galvanic corrosion can also be suppressed at the bonding portion.

The term "metallic bonding" means that different metals that are to be bonded together form a bonding interface in which they are tightly bonded at the metal structural level so that conductivity and mechanical bonding strength are increased to "values suitable for a busbar in practical use".

Preferably, the cathode connector is formed of aluminum or an aluminum alloy, and the anode connector is formed of copper or a copper alloy.

It is essential to manufacture the above-described busbar by a manufacturing method including preparing an opposing base material in which a metal base material that forms the cathode connector is surrounded by a metal base material that forms the anode connector or the metal base material that forms the anode connector is surrounded by the metal base material that forms the cathode connector and subjecting the opposing base material to extrusion or drawing using a die under a high hydrostatic pressure.

According to this manufacturing method, a busbar capable of appropriately connecting a positive terminal of a battery to a negative terminal of another battery can be manufactured by integrating the metal material that forms the cathode connector and the metal material that forms the anode connector together by metallic bonding.

Advantageous Effects of Invention

According to the present invention, a high-performance, high-reliability busbar can be realized which is suitable for use with a battery including a positive terminal and a negative terminal formed of different metals, in which galvanic corrosion can be suppressed and an electrical resistance can be reduced, and which has high mechanical strength.

DESCRIPTION OF EMBODIMENTS

Embodiments of the present invention will now be described below with reference to the drawings.

[First Embodiment]

Figure 1:
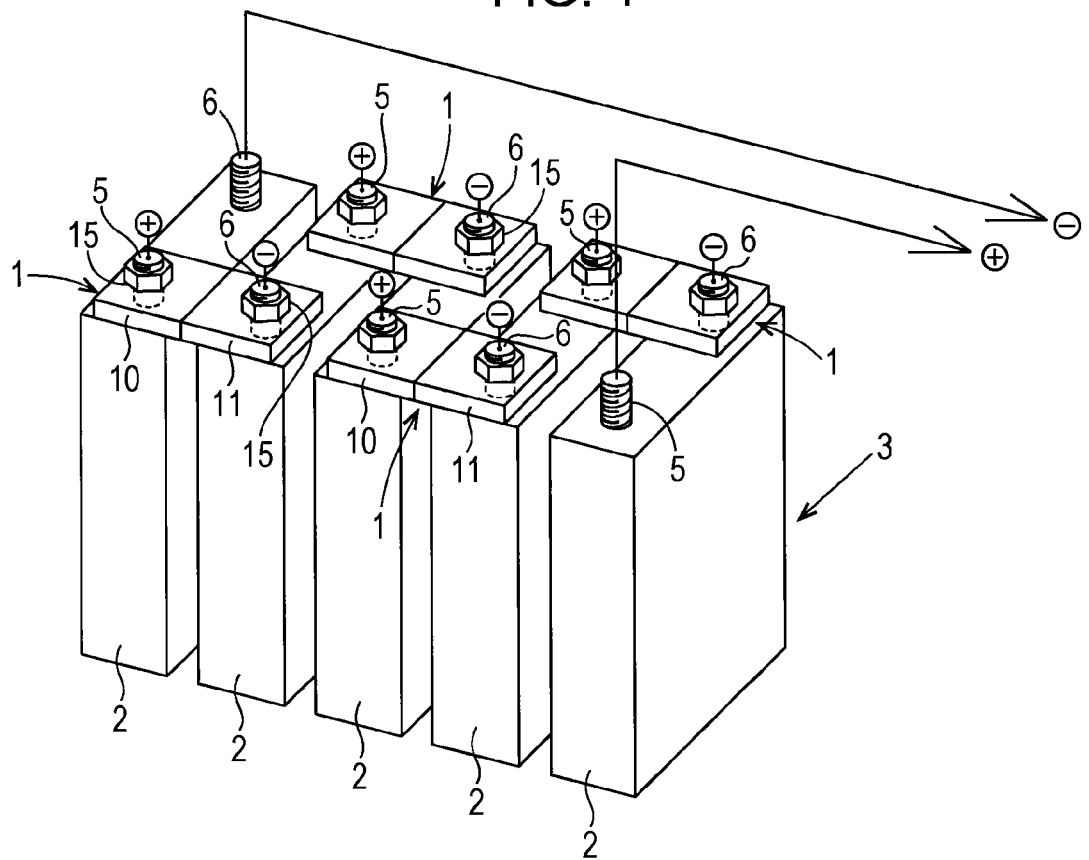
FIG. 1 is a perspective view illustrating the manner in which busbars according to a first embodiment is used.
Figure 2A:
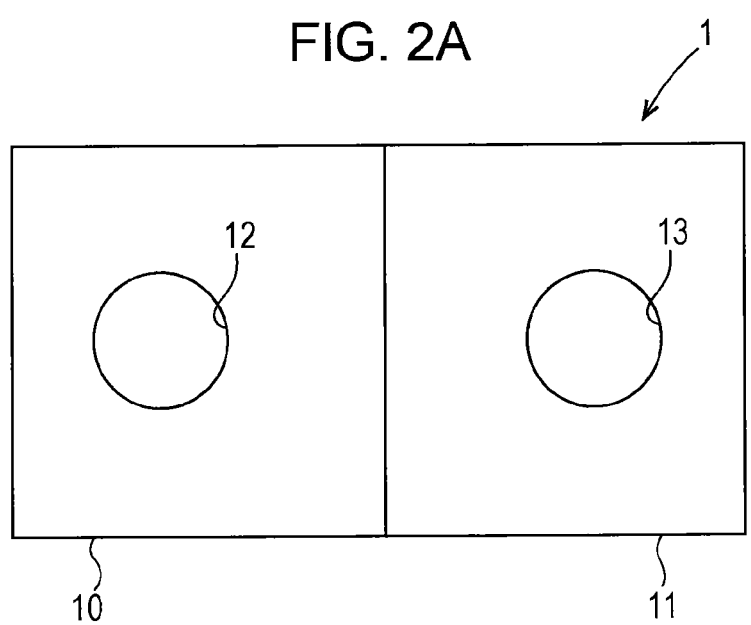
FIG. 2A is a plan view of a busbar according to the first embodiment.
Figure 2B:
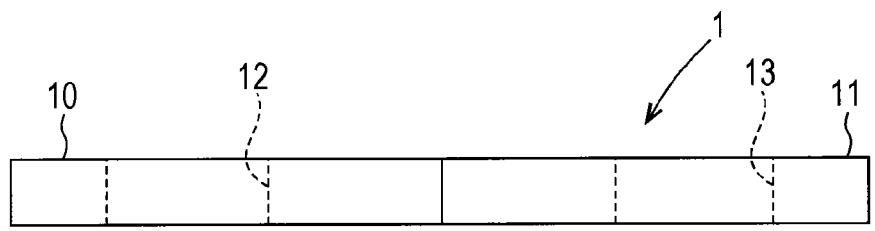
FIG. 2B is a front view of the busbar according to the first embodiment.
Figure 3:
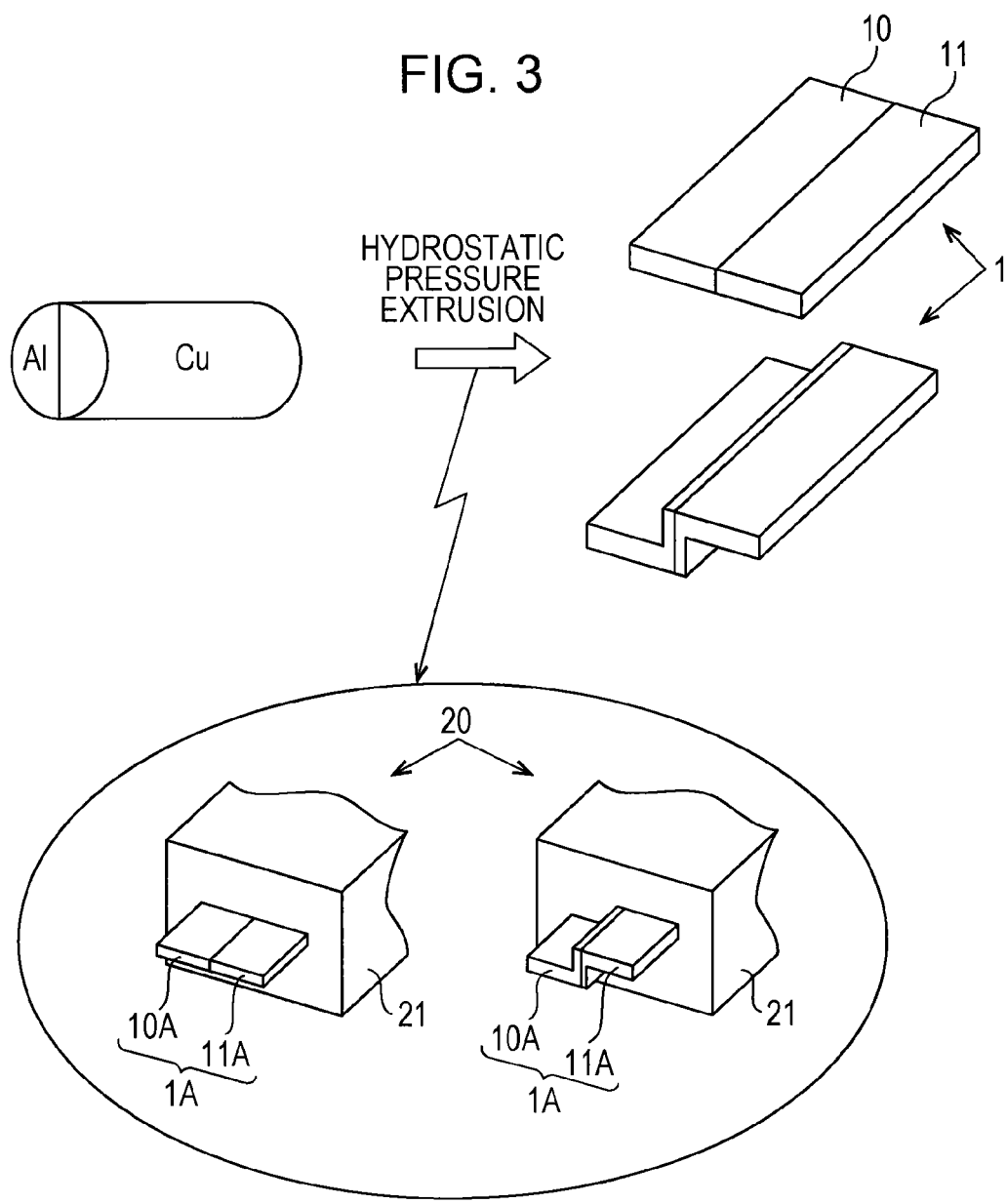
FIG. 3 is a perspective view illustrating a process of manufacturing busbars according to the present invention.

FIGS. 1 to 3 illustrate busbars 1 according to a first embodiment of the present invention.

FIG. 1 illustrates an example of how the busbars 1 are used. In an assembled battery 3 including a plurality of battery cells 2 that are connected in series, the busbars 1 are used to connect positive terminals 5 and negative terminals 6 of the battery cells 2 to each other.

Each battery cell 2 is a lithium-ion battery. The positive terminal 5 of each battery cell 2 is made of aluminum or an aluminum alloy and has an outer peripheral surface that is externally threaded. The negative terminal 6 of each battery cell 2 is made of copper or a copper alloy and has an outer peripheral surface that is externally threaded.

As illustrated in FIGS. 2A and 2B, each busbar 1 has the shape of an oblong rectangular plate, and is divided into substantially two halves at the middle position in the long-side direction thereof. One of the two halves is a cathode connector 10, and the other is an anode connector 11. The dimensions of the busbar 1 may be appropriately set in accordance with, for example, the positions of the two battery cells 2 and the amount of current to be conducted. For example, the length of the long side, the length of the short side, and the thickness may be 30 to 70 mm, 20 to 60 mm, and 1 to 2 mm, respectively.

The cathode connector 10 and the anode connector 11 of the busbar 1 are formed of different metals. The cathode connector 10 is formed of the same metal as the positive terminal 5 of each battery cell 2, that is, aluminum or aluminum alloy. The anode connector 11 is formed of the same metal as the negative terminal 6, that is, copper or copper alloy.

The boundary between the cathode connector 10 and the anode connector 11 of the busbar 1 is formed by placing the metal of the cathode connector 10 (Al) and the metal of the anode connector 11 (Cu) under an ultrahigh pressure (for example, about 1,000 MPa) and causing deformation thereof. The metals are bonded so as to form a bonding interface in which they are tightly bonded at the metal structural level so that the conductivity and mechanical bonding strength are increased to "values suitable for a busbar in practical use".

As illustrated in FIGS. 2A and 2B, a connection hole 12 that allows the positive terminal 5 of each battery cell 2 to be inserted therethrough is formed in the cathode connector 10 at substantially the central position in the short-side direction thereof. Similarly, a connection hole 13 that allows the negative terminal 6 of each battery cell 2 to be inserted therethrough is formed in the anode connector 11 at substantially the central position in the short-side direction thereof.

Referring to FIG. 1, each cathode connector 10 is connected to the corresponding positive terminal 5 by inserting the positive terminal 5 through the connection hole 12 and engaging a nut 15 with the positive terminal 5 that projects from the connection hole 12. Similarly, each anode connector 11 is connected to the corresponding negative terminal 6 by inserting the negative terminal 6 through the connection hole 13 and engaging a nut 15 with the negative terminal 6.

Instead of using the nuts 15, each cathode connector 10 may be welded to the corresponding positive terminal 5, and each anode connector 11 may be welded to the corresponding negative terminal 6. In other words, metal parts of each busbar that are formed of different metals may be directly welded to the respective terminals made of the same metals as the metal parts.

Referring to FIG. 3, each busbar 1 having the above-described structure is manufactured by extrusion under an ultrahigh hydrostatic pressure. An extruder 20 used in this process includes a die 21 having a single opening whose shape corresponds to a cross sectional shape (planar shape) of the busbar 1 to be manufactured along the long-side direction. The extruder 20 is capable of performing extrusion under an ultrahigh isotropic pressure (for example, about 1,000 MPa).

In the process of manufacturing the busbar 1, first, a cathode base material 10A (metal base material) made of the same metal as the positive terminal 5 of each battery cell 2 (aluminum or aluminum alloy) and an anode base material 11A (metal base material) made of the same metal as the negative terminal 6 of each battery cell 2 (copper or copper alloy) are prepared. The cathode base material 10A and the anode base material 11A are formed as, for example, section bars, and are bonded together along the longitudinal direction into the form of a round bar-shaped billet (opposing base material).

Next, the billet is fed to the extruder 20 so that the cathode base material 10A and the anode base material 11A are extruded parallel to each other.

In this state, the extruder 20 is operated so as to perform extrusion or drawing under an ultrahigh isotropic pressure, so that a formed body 1A including the cathode base material 10A and the anode base material 11A that are integrated together by metallic bonding is obtained.

As illustrated in FIG. 3, the opening area of the die 21 of the extruder 20 is smaller than the cross sectional area of the billet. Therefore, when the billet passes through the die 21, the billet is compressed at the entire periphery thereof and is plastically deformed. The opposing surfaces of the base materials 10A and 11A form a bonding interface (metallic bonding portion) between the cathode connector 10 and the anode connector 11 after leaving the die 21.

The formed body 1A obtained by the above-described process is cut at predetermined intervals in the extruding direction. After the cutting process, the connection hole 12 is formed in the cathode connector 10 and the connection hole 13 is formed in the anode connector 11. Thus, the busbar 1 is completed. A surface polishing process or a surface treatment process may be performed as necessary.

In the busbar 1 that is manufactured by the above-described process, the cathode connector 10 made of the same metal as the positive terminal 5 of each battery cell 2 and the anode connector 11 made of the same metal as the negative terminal 6 of each battery cell 2 are integrated together by metallic bonding. Therefore, galvanic corrosion does not occur at any part of the busbar 1 (including the parts connected to the battery terminals and the bonding surface between the cathode connector 10 and the anode connector 11), so that the electrical resistance can be reduced and the mechanical strength can be increased.

[Second Embodiment]

Figure 4A:
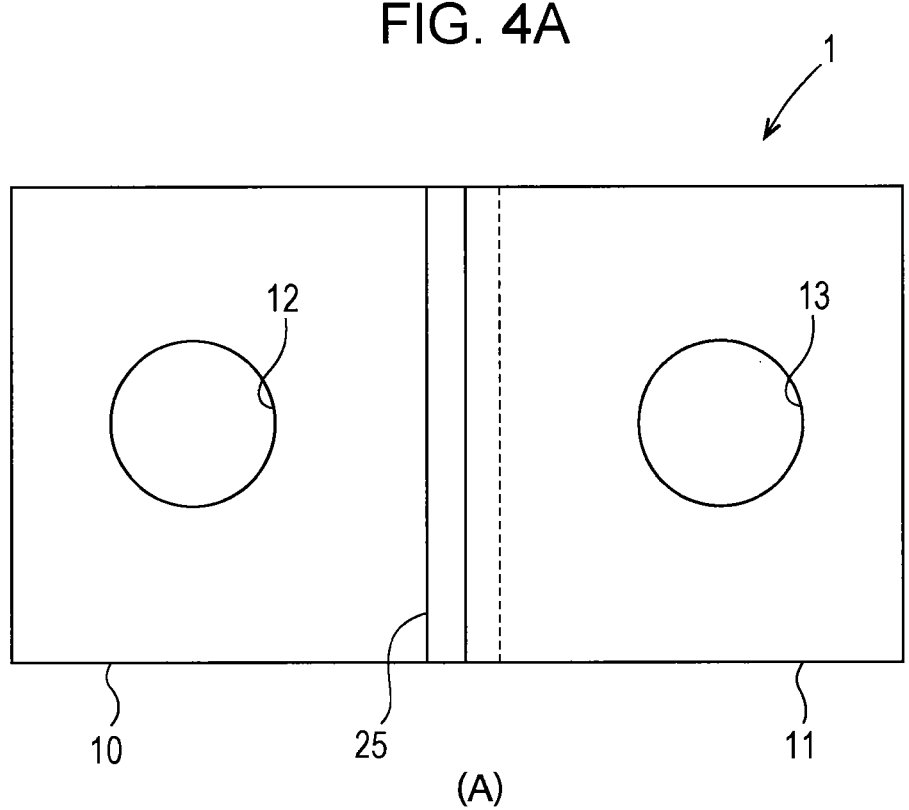
FIG. 4A is a plan view of a busbar according to a second embodiment.
Figure 4B:
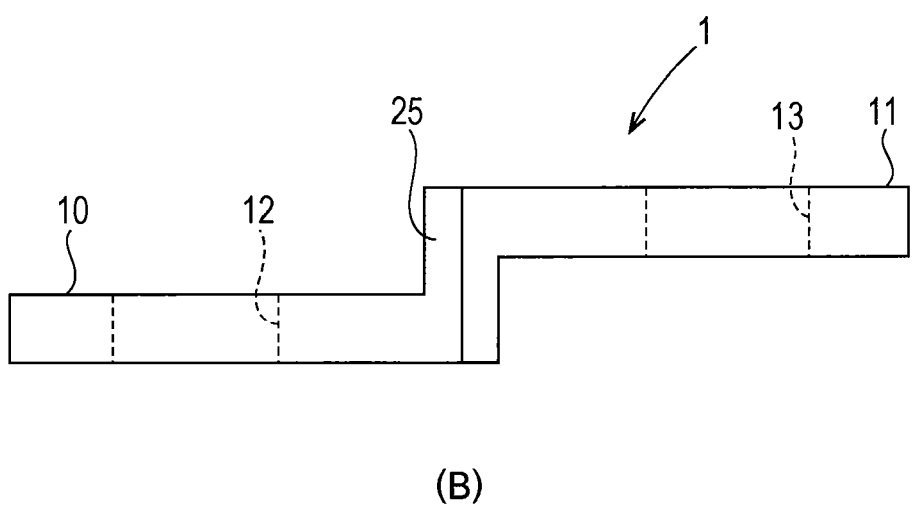
FIG. 4B is a front view of the busbar according to the second embodiment.

FIGS. 4A and 4B illustrate a busbar 1 according to a second embodiment of the present invention.

The busbar 1 according to the second embodiment includes a step portion 25 that is crank-shaped in side view at the position where the bonding interface (metallic bonding portion) is formed between the cathode connector 10 and the anode connector 11. Accordingly, the cathode connector 10 and the anode connector 11 are at different heights. The busbar 1 including the step portion 25 is capable of directly connecting the battery cells 2 that are arranged at different heights (or different positions in the horizontal direction) to each other.

The height difference between the cathode connector 10 and the anode connector 11 at the step portion 25 is not restricted in any way. It is not necessary that the step portion 25 be formed at the bonding interface between the cathode connector 10 and the anode connector 11, and the step portion 25 may instead be formed at a position shifted toward the cathode connector 10 or the anode connector 11.

In addition, the step portion 25 is not necessarily crank-shaped, and may instead be smoothly curved in the shape of the letter 'S'.

Also when the busbar 1 according to the second embodiment is manufactured, extrusion or drawing is performed under an ultrahigh isotropic pressure (about 1,000 MPa or less). In this case, as illustrated in FIG. 3, the opening of the die 21 is formed in the crank-shape that corresponds to the cross sectional shape of the busbar 1 along the long-side direction.

Other structures, operational effects, and the manufacturing method of the second embodiment are similar to those of the first embodiment, and detailed explanations thereof are thus omitted.

EXAMPLE 1

A characteristic of a busbar according to the first embodiment manufactured by extrusion or drawing under an ultrahigh isotropic pressure are shown in Table 1.

Busbars manufactured by welding using the friction stir method (friction stir welding (FSW)), which is one of manufacturing methods according to the related art, and a busbar manufactured by laser beam welding, which is another one of manufacturing methods according to the related art, are shown as comparative examples.

TABLE 1

| Bonding Method | Electric Conductivity (% IACS) of Pure Al-Pure Cu Bonded Body |
|---|---|
| LASER | 60.4 |
| FSW Single | 48.5 |
| FSW Double | 49.0 |
| Present Invention | 66.1 |

As shown in Table 1, the electric conductivities of the busbars formed by friction stir welding were 48.5% (single stirring) and 49.0% (double stirring). Thus, the conductivities were low. The electric conductivity of the busbar formed by laser beam welding was 60.4%, which is higher than those of the busbars formed by friction stir welding. In contrast, the electric conductivity of the busbar according to the first embodiment was 66.1% and was significantly high. Therefore, the busbar according to the first embodiment allows high efficiency power transmission between the battery cells 2 without loss.

The embodiments disclosed herein are exemplary and not restrictive in all aspects. The scope of the present invention is defined by the claims and not by the above explanation, and includes equivalents of the claims and all modifications within the scope.

For example, the position of the bonding interface (metallic bonding portion) between the cathode connector 10 and the anode connector 11 is not restricted to the center of the busbar 1 in the long-side direction thereof, and may instead be shifted toward the cathode connector 10 or the anode connector 11.

In addition, although the busbars 1 according to the present invention are very suitable for connecting lithium-ion batteries mounted in a vehicle, the busbars 1 may instead be used to connect lithium-ion batteries for other uses.

[Third Embodiment]

Figure 5:
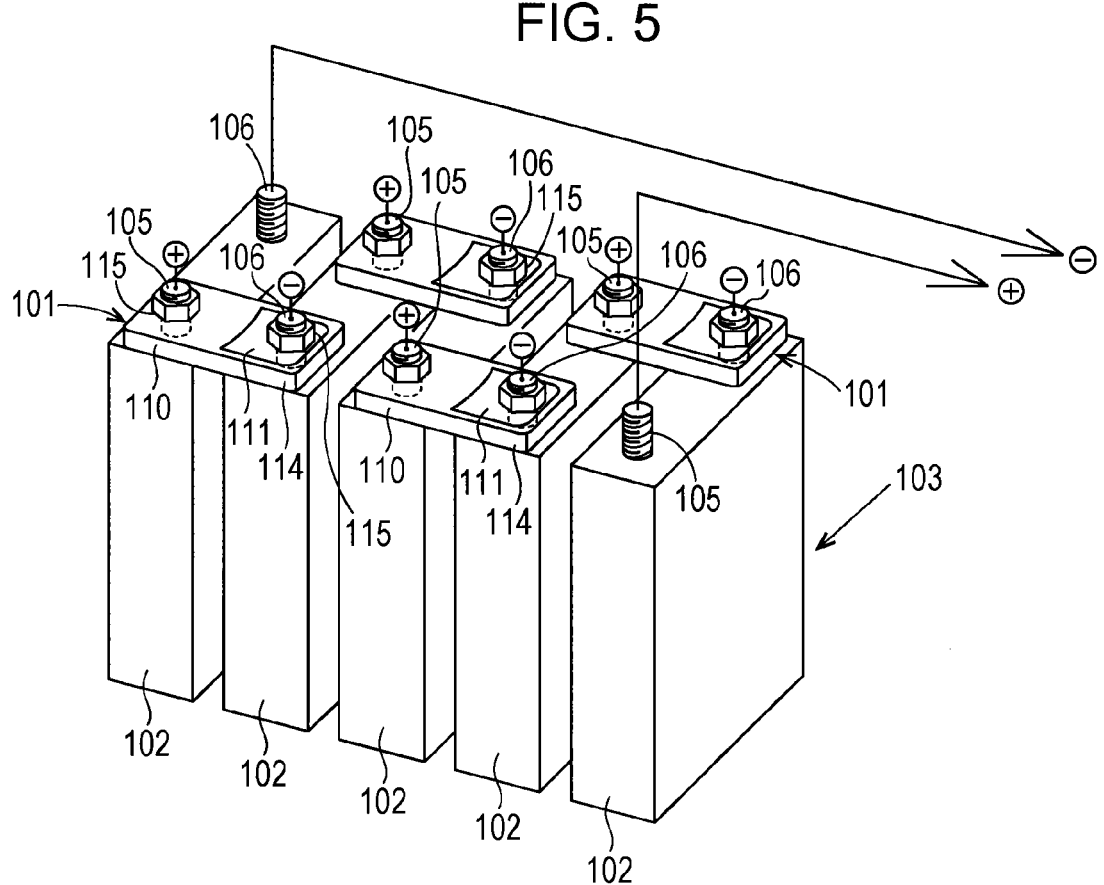
FIG. 5 is a perspective view illustrating the manner in which busbars according to a third embodiment is used.
Figure 6A:
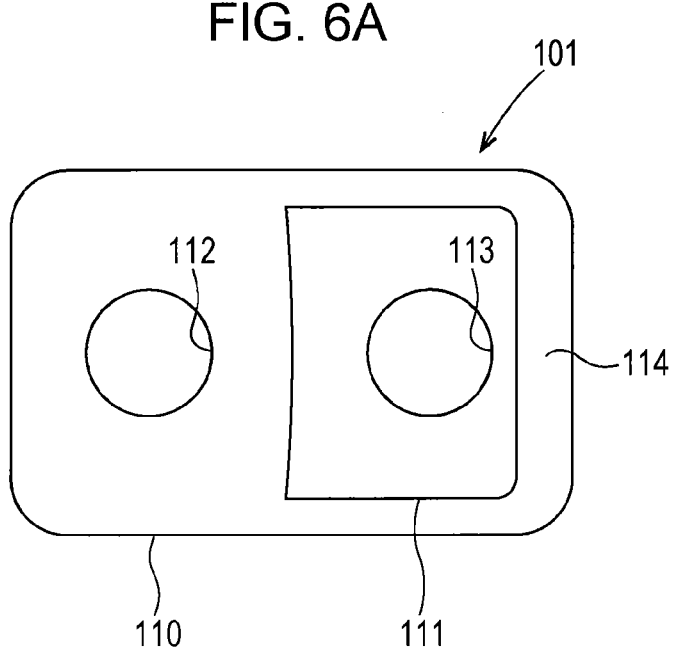
FIG. 6A is a plan view of a busbar according to the third embodiment.
Figure 6B:
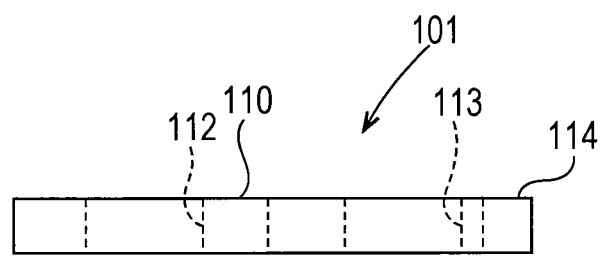
FIG. 6B is a front view of the busbar according to the third embodiment.
Figure 6C:
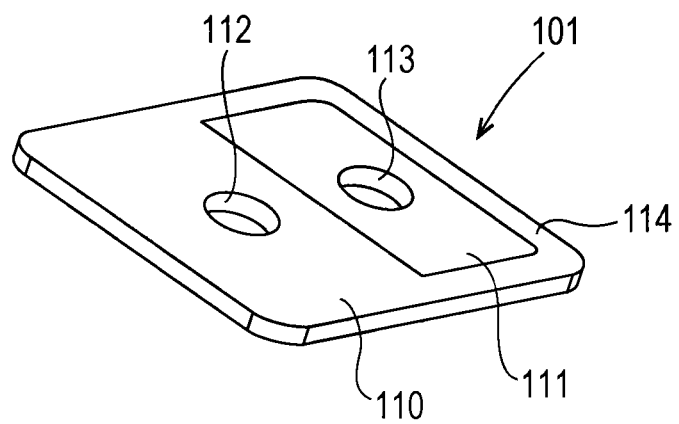
FIG. 6C is a perspective view of the busbar according to the third embodiment.
Figure 7:
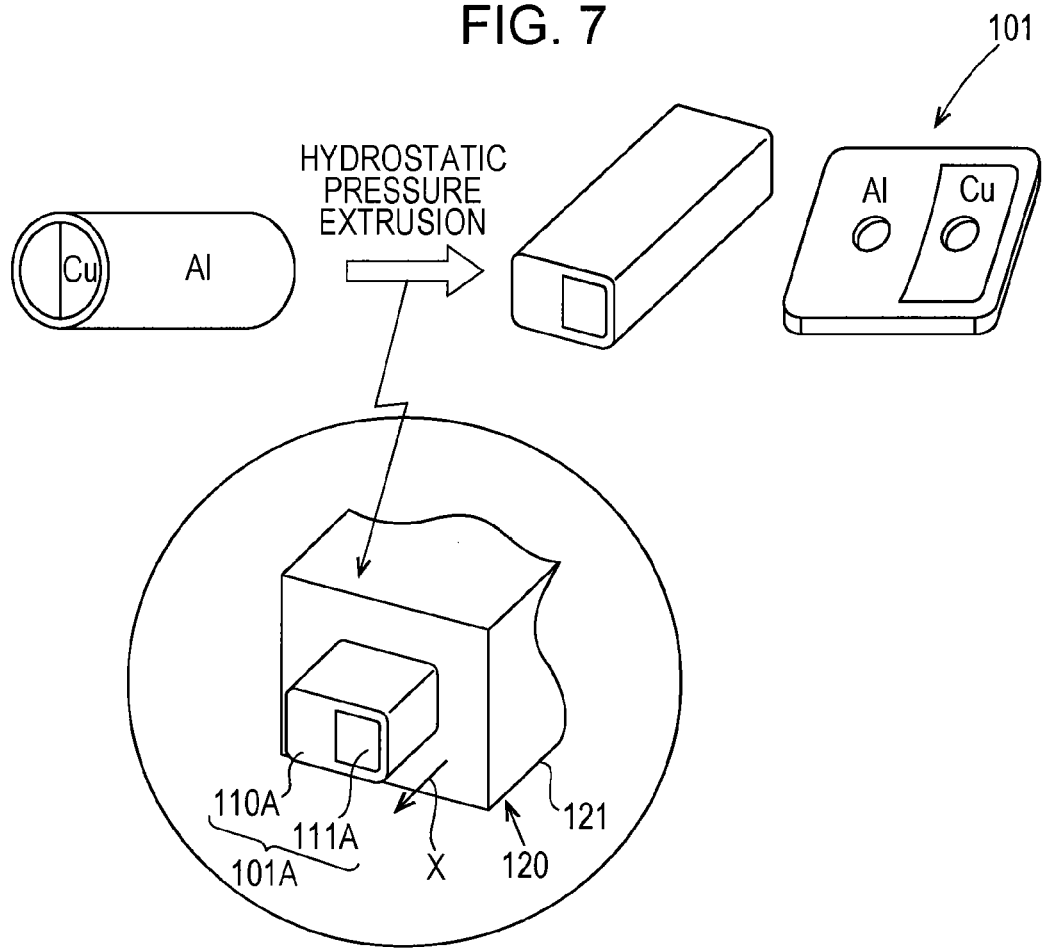
FIG. 7 is a perspective view illustrating a process of manufacturing a busbar according to the present invention.

FIGS. 5 to 7 illustrate busbars 101 according to a third embodiment of the present invention.

FIG. 5 illustrates an example of how the busbars 101 are used. In an assembled battery 103 including a plurality of battery cells 102 that are connected in series, the busbars 101 are used to connect positive terminals 105 and negative terminals 106 of the battery cells 102 to each other.

Each battery cell 102 is a lithium-ion battery. The positive terminal 105 of each battery cell 102 is made of aluminum or an aluminum alloy and has an outer peripheral surface that is externally threaded. The negative terminal 106 of each battery cell 102 is made of copper or a copper alloy and has an outer peripheral surface that is externally threaded.

As illustrated in FIGS. 6A to 6C, each busbar 101 has the shape of an oblong rectangular plate, and is divided into substantially two halves at the middle position in the long-side direction thereof. One of the two halves is a cathode connector 110, and the other is an anode connector 111. In the present embodiment, the cathode connector 110 includes a frame portion 114 that extends to the anode-connector-111 side, and the anode connector 111 is fitted in the frame portion 114. In other words, the entire periphery of the anode connector 111 is surrounded by the cathode connector 110.

The dimensions of the busbar 101 may be appropriately set in accordance with, for example, the positions of the two battery cells 102 and the amount of current to be conducted. For example, the length of the long side, the length of the short side, and the thickness may be 30 to 70 mm, 20 to 60 mm, and 1 to 2 mm, respectively.

The cathode connector 110 and the anode connector 111 of the busbar 101 are formed of different metals. The cathode connector 110 is formed of the same metal as the positive terminal 105 of each battery cell 102, that is, aluminum or aluminum alloy. The anode connector 111 is formed of the same metal as the negative terminal 106, that is, copper or copper alloy.

The cathode connector 110 and the anode connector 111 are integrally bonded together by metallic bonding at the bonding surface along the inner periphery of the frame portion 114. The bonding surface (boundary surface) is formed by placing the metal of the cathode connector 110 (Al) and the metal of the anode connector 111 (Cu) under an ultrahigh pressure (for example, about 1,000 MPa) and causing deformation thereof. The metals are bonded so as to form a bonding interface in which they are tightly bonded at the metal structural level so that the conductivity and mechanical bonding strength are increased to "values suitable for a busbar in practical use".

Referring to FIGS. 6A to 6C, since aluminum or aluminum alloy which forms the cathode connector 110 is softer than copper or copper alloy which forms the anode connector 111, the cathode connector 110 is formed so as to swell toward the anode connector 111 in the extrusion of the metals under an ultrahigh hydrostatic pressure. Therefore, the anode connector 111 is formed so as to be recessed in plan view in the present embodiment.

As illustrated in FIGS. 6A to 6C, a connection hole 112 that allows the positive terminal 105 of each battery cell 102 to be inserted therethrough is formed in the cathode connector 110 at substantially the central position in the short-side direction thereof. Similarly, a connection hole 113 that allows the negative terminal 106 each battery cell 102 to be inserted therethrough is formed in the anode connector 111 at substantially the central position in the short-side direction thereof.

Referring to FIG. 5, each cathode connector 110 is connected to the corresponding positive terminal 105 by inserting the positive terminal 105 through the connection hole 112 and engaging a nut 115 with the positive terminal 105 that projects from the connection hole 112. Similarly, each anode connector 111 is connected to the corresponding negative terminal 106 by inserting the negative terminal 106 through the connection hole 113 and engaging a nut 115 with the negative terminal 106.

Instead of using the nuts 115, each cathode connector 110 may be welded to the corresponding positive terminal 105, and each anode connector 111 may be welded to the corresponding negative terminal 106. In other words, metal parts of each busbar that are formed of different metals may be directly welded to the respective terminals made of the same metals as the metal parts.

Referring to FIG. 7, each busbar 101 having the above-described structure is manufactured by extrusion under an ultrahigh hydrostatic pressure. An extruder 120 used in this process includes a die 121 having a single opening whose shape corresponds to a cross sectional shape (planar shape) of the busbar 101 to be manufactured along the long-side direction. The extruder 120 is capable of performing extrusion under an ultrahigh isotropic pressure (for example, about 1,000 MPa).

In the process of manufacturing the busbar 101, first, a section-bar shaped cathode base material 110A (metal base material) made of the same metal as the positive terminal 105 of each battery cell 102 (aluminum or aluminum alloy) and a section-bar shaped anode base material 111A (metal base material) made of the same metal as the negative terminal 106 of each battery cell 102 (copper or copper alloy) are prepared. Next, the section-bar shaped cathode base material 110A and anode base material 111A are bonded together along the longitudinal direction to form a bonded member, and the outer periphery of the bonded member is wrapped by a plate-shaped cathode base material 110A. Thus, a round-bar shaped billet (opposing base material) is prepared. The billet may instead be formed by fitting the bonded member formed by bonding the cathode base material 110A and the anode base material 111A together into a hollow-pipe-shaped cathode base material 110A.

Next, the billet is fed to the extruder 120 so that the cathode base material 110A and the anode base material 111A are extruded parallel to each other.

In this state, the extruder 120 is operated so as to perform extrusion or drawing under an ultrahigh isotropic pressure, so that a formed body 101A including the cathode base material 110A and the anode base material 111A that are integrated together by metallic bonding is obtained.

As illustrated in FIG. 7, the opening area of the die 121 of the extruder 120 is smaller than the cross sectional area of the billet. Therefore, when the billet passes through the die 121, the billet is compressed at the entire periphery thereof and is plastically deformed. The opposing surfaces of the base materials 110A and 111A form a bonding interface (metallic bonding portion) between the cathode connector 110 and the anode connector 111 after leaving the die 121.

The formed body 101A obtained by the above-described process is cut at predetermined intervals in the extruding direction. After the cutting process, the connection hole 112 is formed in the cathode connector 110 and the connection hole 113 is formed in the anode connector 111. Thus, the busbar 101 is completed. A surface polishing process or a surface treatment process may be performed as necessary.

In the busbar 101 that is manufactured by the above-described process, the cathode connector 110 made of the same metal as the positive terminal 105 of each battery cell 102 and the anode connector 111 made of the same metal as the negative terminal 106 of each battery cell 102 are integrated together by metallic bonding. Therefore, galvanic corrosion does not occur at any part of the busbar 101 (including the parts connected to the battery terminals and the bonding surface between the cathode connector 110 and the anode connector 111), so that the electrical resistance can be reduced and the mechanical strength can be increased.

[Fourth Embodiment]

Figure 8A:
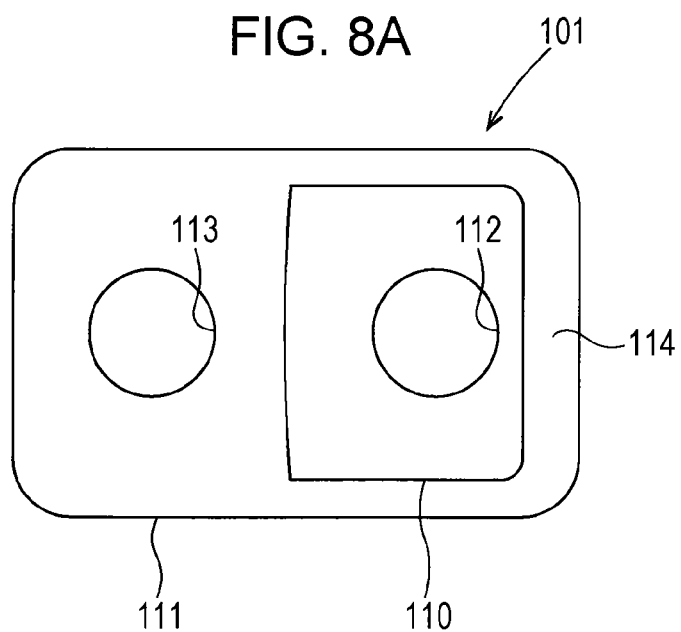
FIG. 8A is a plan view of a busbar according to a fourth embodiment.
Figure 8B:
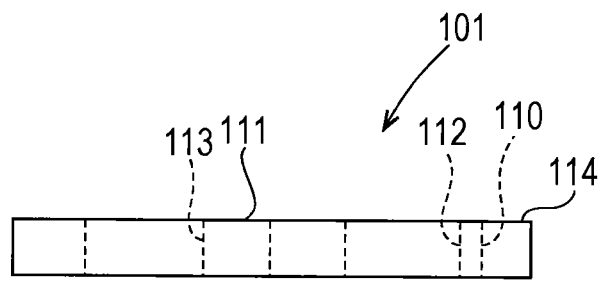
FIG. 8B is a front view of the busbar according to the fourth embodiment.
Figure 8C:
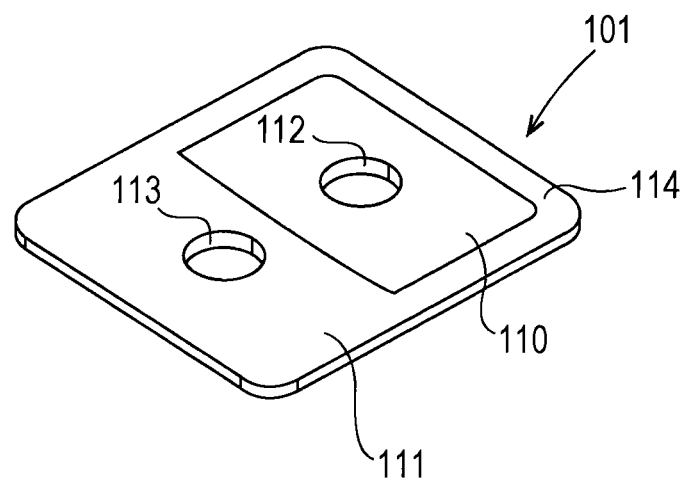
FIG. 8C is a perspective view of the busbar according to the fourth embodiment.

FIGS. 8A to 8C illustrate a busbar 101 according to a fourth embodiment of the present invention.

The busbar 101 of the fourth embodiment also has the shape of an oblong rectangular plate, and is divided into substantially two halves at the middle position in the long-side direction thereof. One of the two halves is a cathode connector 110 (Al), and the other is an anode connector 111 (Cu).

In the present embodiment, the anode connector 111 includes a frame portion 114 that extends to the cathode-connector-110 side, and the cathode connector 110 is fitted in the frame portion 114. In other words, the entire periphery of the cathode connector 110 is surrounded by the anode connector 111.

Referring to FIGS. 8A to 8C, since aluminum or aluminum alloy which forms the cathode connector 110 is softer than copper or copper alloy which forms the anode connector 111, the cathode connector 110 is formed so as to swell toward the anode connector 111 in the extrusion of the metals under an ultrahigh hydrostatic pressure. Therefore, the cathode connector 110 is formed so as to swell outward in plan view in the present embodiment.

Other structures, operational effects, and the manufacturing method of the fourth embodiment are similar to those of the third embodiment, and detailed explanations thereof are thus omitted.

The embodiments disclosed herein are exemplary and not restrictive in all aspects. The scope of the present invention is defined by the claims and not by the above explanation, and includes equivalents of the claims and all modifications within the scope.

For example, the length and width of the frame portion 114 are not limited. In addition, the ratio between the areas of the cathode connector 110 and the anode connector 111 in plan view may be changed as appropriate.

In addition, although the busbars 101 according to the present invention are very suitable for connecting lithium-ion batteries mounted in a vehicle, the busbars 101 may instead be used to connect lithium-ion batteries for other uses.

Although the present application has been described in detail with reference to specific embodiments, various alterations and modifications are possible within the spirit and scope of the present invention.

This application is based on Japanese Patent Application filed Mar. 29, 2010 (Japanese Patent Application No. 2010-075915) and Japanese Patent Application filed Mar. 29, 2010 (Japanese Patent Application No. 2010-075917), the contents of which are incorporated herein by reference.

| Reference Signs List | |
|---|---|
| 1 | busbar |
| 1A | formed body |
| 2 | cell |
| 3 | assembled battery |
| 5 | cathode terminal |
| 6 | anode terminal |
| 10 | cathode connector |
| 10A | cathode base material |
| 11 | anode connector |
| 11A | anode base material |
| 12 | connection hole |
| 13 | connection hole |
| 15 | nut |
| 20 | extruder |
| 21 | die |
| 25 | step portion |
| 101 | busbar |
| 101A | formed body |
| 102 | cell |
| 103 | assembled battery |
| 105 | cathode terminal |
| 106 | anode terminal |
| 110 | cathode connector |
| 110A | cathode base material |
| 111 | anode connector |
| 111A | anode base material |
| 112 | connection hole |
| 113 | connection hole |
| 114 | frame portion |
| 115 | nut |
| 120 | extruder |
| 121 | die |
| 125 | step portion |

The invention claimed is:

1. A busbar for use with a battery including a positive terminal and a negative terminal formed of different metals, the busbar being used to connect the terminals, the busbar comprising:
    a cathode connector made of the same metal as the positive terminal of the battery and connectable to the positive terminal; and
    an anode connector made of the same metal as the negative terminal of the battery and connectable to the negative terminal,
    wherein the cathode connector and the anode connector are integrated together by metallic bonding wherein the cathode connector and the anode connector are bonded at the metal structural level by compressive pressure.

2. The busbar according to claim 1, wherein the cathode connector is formed of aluminum or an aluminum alloy, and wherein the anode connector is formed of copper or a copper alloy.

3. A busbar manufacturing method for manufacturing a busbar of a battery including a positive terminal and a negative terminal formed of different metals, the method comprising:
    providing a metal base material for a cathode connector and a metal base material for an anode connector in surface contact with each other, wherein the cathode connector is made of the same metal as the positive terminal of the battery and the anode connector is made of the same metal as the negative terminal of the battery; and
    subjecting the metal base material for the cathode connector and the metal base material for the anode connector, while in surface contact with each other, to hydrostatic pressure and compression sufficient to plastically deform the metal base material for the cathode connector and the metal base material for the anode connector and to integrate the metal base material for the cathode connector and the metal base material for the anode connector to each other by metallic bonding.

4. The busbar manufacturing method according to claim 3, wherein the cathode connector is formed of aluminum or an aluminum alloy, and the anode connector is formed of copper or a copper alloy.

5. The busbar manufacturing method according to claim 3, wherein the metal base material that forms the cathode connector is surrounded by a metal base material that forms the anode connector, or the metal base material that forms the anode connector is surrounded by the metal base material that forms the cathode connector.

6. The busbar manufacturing method according to claim 5, wherein the cathode connector is formed of aluminum or an aluminum alloy, and the anode connector is formed of copper or a copper alloy.

7. The busbar manufacturing method according to claim 3, wherein the step of subjecting the metal base material for a cathode connector and the metal base material for an anode connector, while in surface contact with each other, to hydrostatic pressure and compression comprises simultaneously extruding or drawing a billet comprised of the metal base material for a cathode connector and the metal base material for an anode connector through a die having an opening area smaller than the cross-sectional area of the billet.

8. The busbar manufacturing method according to claim 5, wherein the step of subjecting the metal base material for a cathode connector and the metal base material for an anode connector, while in surface contact with each other, to hydrostatic pressure and compression comprises simultaneously extruding or drawing a billet comprised of the metal base material for a cathode connector and the metal base material for an anode connector through a die having an opening area smaller than the cross-sectional area of the billet.

9. A busbar for use with a battery including a positive terminal and a negative terminal formed of different metals, the busbar being used to connect the terminals, the busbar comprising:

a cathode connector made of the same metal as the positive terminal of the battery and connectable to the positive terminal; and an anode connector made of the same metal as the negative terminal of the battery and connectable to the negative terminal, wherein the cathode connector is surrounded by the anode connector or the anode connector is surrounded by the cathode connector in plan view, and wherein the cathode connector and the anode connector are integrally bonded together by metallic bonding wherein the cathode connector and the anode connector are bonded at the metal structural level by compressive pressure.

10. The busbar according to claim 9, wherein the cathode connector is formed of aluminum or an aluminum alloy, and wherein the anode connector is formed of copper or a copper alloy.

* * * * *